(12) United States Patent
Spahl et al.

(10) Patent No.: US 10,023,019 B2
(45) Date of Patent: Jul. 17, 2018

(54) REAR SUSPENSION SYSTEMS WITH ROTARY DEVICES FOR LATERALLY TILTABLE MULTITRACK VEHICLES

(71) Applicant: FORD GLOBAL TECHNOLOGIES, LLC, Dearborn, MI (US)

(72) Inventors: Robert Spahl, Köln (DE); Marc Simon, Köln (DE); Edmund Halfmann, Neuss (DE); Thomas Gerhards, Niederzier (DE); Rainer Souschek, Juelich (DE); Ralf Hintzen, Aachen (DE); Daniel Mainz, Herzogenrath (DE); Martin Saeger, Pulheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/630,106

(22) Filed: Feb. 24, 2015

(65) Prior Publication Data
US 2016/0244094 A1 Aug. 25, 2016

(51) Int. Cl.
*B60G 17/00* (2006.01)
*B60G 21/05* (2006.01)

(52) U.S. Cl.
CPC .............. *B60G 17/00* (2013.01); *B60G 21/05* (2013.01); *B60G 2204/62* (2013.01); *B60G 2204/8304* (2013.01); *B60G 2300/13* (2013.01); *B60G 2300/45* (2013.01)

(58) Field of Classification Search
CPC ........ B60G 21/05; B60G 21/055; B60G 9/02; B60G 9/027; B60G 2800/012; B60G 2800/0124; B60G 17/00; B60G 2204/8304; B62D 9/02; B62D 9/04
See application file for complete search history.

(56) References Cited

U.S. PATENT DOCUMENTS

| 2,186,065 A | 1/1940 | Fischer |
| 2,353,503 A | 7/1944 | Rost et al. |
| 2,474,471 A | 6/1949 | Dolan |
| 3,309,097 A | 3/1967 | Fritz |

(Continued)

FOREIGN PATENT DOCUMENTS

| CN | 1918013 A | 2/2007 |
| DE | 679966 C | 8/1939 |

(Continued)

OTHER PUBLICATIONS

Notice of Allowance dated Mar. 19, 2015 for patented U.S. Appl. No. 14/201,550.

(Continued)

*Primary Examiner* — Barry Gooden, Jr.
(74) *Attorney, Agent, or Firm* — Jones Robb, PLLC; Frank MacKenzie

(57) ABSTRACT

A suspension system for a laterally tiltable, multitrack vehicle may include a balancer system extending between first and second trailing arms. The suspension system may further include a rotary device acting between the trailing arms. One of the balancer system and the rotary device may be configured to provide a torque to influence a leaning angle of the vehicle and the other of the balancer system and the rotary device may be configured to suppress resonant vertical motion of the vehicle.

25 Claims, 9 Drawing Sheets

(56) References Cited

U.S. PATENT DOCUMENTS

| | | | |
|---|---|---|---|
| 3,417,985 A | 12/1968 | Hannan | |
| 3,558,123 A | 1/1971 | Yew | |
| 3,572,456 A | 3/1971 | Healy | |
| 3,589,700 A * | 6/1971 | Ruet | B60G 11/32 |
| | | | 267/221 |
| 3,733,087 A * | 5/1973 | Allison | B60G 7/001 |
| | | | 267/276 |
| 3,990,725 A * | 11/1976 | Allison | B60G 7/001 |
| | | | 267/188 |
| 3,992,036 A * | 11/1976 | Allison | B60G 7/001 |
| | | | 280/124.137 |
| 4,273,357 A * | 6/1981 | Pashkow | B60G 9/003 |
| | | | 280/124.116 |
| 4,351,410 A | 9/1982 | Townsend | |
| 4,375,293 A | 3/1983 | Solbes | |
| 4,458,918 A * | 7/1984 | Rumpel | B60G 3/202 |
| | | | 267/262 |
| 4,614,359 A * | 9/1986 | Lundin | B60G 3/205 |
| | | | 267/246 |
| 4,632,413 A | 12/1986 | Fujita et al. | |
| 4,657,271 A * | 4/1987 | Salmon | B62D 9/02 |
| | | | 280/124.139 |
| 4,659,106 A | 4/1987 | Fujita et al. | |
| 4,685,690 A | 8/1987 | Fujita et al. | |
| 4,779,893 A * | 10/1988 | Juechter | B60G 11/08 |
| | | | 280/124.143 |
| 4,887,829 A | 12/1989 | Prince | |
| 5,040,812 A | 8/1991 | Patin | |
| 5,040,823 A | 8/1991 | Lund | |
| 5,069,476 A | 12/1991 | Tsutsumi et al. | |
| 5,116,069 A | 5/1992 | Miller | |
| 5,161,425 A | 11/1992 | Baskett et al. | |
| 5,161,822 A | 11/1992 | Lund | |
| 5,207,451 A | 5/1993 | Furuse et al. | |
| 5,324,056 A | 6/1994 | Orton | |
| 5,337,847 A | 8/1994 | Woods et al. | |
| 5,347,457 A | 9/1994 | Tanaka et al. | |
| 5,445,443 A | 8/1995 | Hauser et al. | |
| 5,580,089 A | 12/1996 | Kolka | |
| 5,611,555 A | 3/1997 | Vidal | |
| 5,762,351 A | 6/1998 | Soohoo | |
| 5,765,115 A | 6/1998 | Ivan | |
| 5,765,846 A | 6/1998 | Braun | |
| 5,772,224 A | 6/1998 | Tong | |
| 5,791,425 A | 8/1998 | Kamen et al. | |
| 5,825,284 A | 10/1998 | Dunwoody et al. | |
| 5,839,082 A | 11/1998 | Iwasaki | |
| 5,927,424 A | 7/1999 | Van Den Brink et al. | |
| 6,026,920 A | 2/2000 | Obeda et al. | |
| 6,116,618 A | 9/2000 | Shono et al. | |
| 6,142,494 A | 11/2000 | Higuchi | |
| 6,149,226 A | 11/2000 | Hoelzel | |
| 6,213,561 B1 | 4/2001 | Witthaus | |
| 6,250,649 B1 | 6/2001 | Braun | |
| 6,311,795 B1 | 11/2001 | Skotnikov | |
| 6,328,125 B1 | 12/2001 | Van Den Brink et al. | |
| 6,367,824 B1 | 4/2002 | Hayashi | |
| 6,390,505 B1 | 5/2002 | Wilson | |
| 6,425,585 B1 | 7/2002 | Schuekle et al. | |
| 6,435,522 B1 | 8/2002 | Van Den Brink et al. | |
| 6,446,980 B1 | 9/2002 | Kutscher et al. | |
| 6,454,035 B1 | 9/2002 | Waskow et al. | |
| 6,460,835 B1 | 10/2002 | Hamano et al. | |
| 6,467,783 B1 | 10/2002 | Blondelet et al. | |
| 6,511,078 B2 | 1/2003 | Sebe | |
| 6,554,293 B1 | 4/2003 | Fennel et al. | |
| 6,564,129 B2 | 5/2003 | Badenoch | |
| 6,637,758 B2 | 10/2003 | Woo | |
| 6,654,674 B2 | 11/2003 | Lu et al. | |
| 6,697,726 B2 | 2/2004 | Takagi et al. | |
| 6,702,265 B1 * | 3/2004 | Zapletal | B60G 5/00 |
| | | | 267/187 |
| 6,722,676 B2 | 4/2004 | Zadok | |
| 6,725,135 B2 | 4/2004 | McKeown et al. | |
| 6,805,362 B1 | 10/2004 | Melcher | |
| 6,817,617 B2 | 11/2004 | Hayashi | |
| 7,066,474 B2 | 6/2006 | Hiebert et al. | |
| 7,073,806 B2 | 7/2006 | Bagnoli | |
| 7,097,187 B2 | 8/2006 | Walters et al. | |
| 7,131,650 B2 | 11/2006 | Melcher | |
| 7,229,086 B1 | 6/2007 | Rogers | |
| 7,343,997 B1 * | 3/2008 | Matthies | B60G 21/007 |
| | | | 180/215 |
| 7,389,592 B2 | 6/2008 | Tsuruta et al. | |
| 7,487,985 B1 | 2/2009 | Mighell | |
| 7,568,541 B2 | 8/2009 | Pfeil et al. | |
| 7,571,787 B2 * | 8/2009 | Saiki | B60G 7/00 |
| | | | 180/210 |
| 7,591,337 B2 | 9/2009 | Suhre et al. | |
| 7,607,695 B2 | 10/2009 | Moulene | |
| 7,631,721 B2 | 12/2009 | Hobbs | |
| 7,640,086 B2 | 12/2009 | Nakashima et al. | |
| 7,641,207 B2 | 1/2010 | Yang | |
| 7,648,148 B1 | 1/2010 | Mercier | |
| 7,665,742 B2 | 2/2010 | Haerr et al. | |
| 7,673,883 B2 | 3/2010 | Damm | |
| 7,731,210 B2 * | 6/2010 | Pedersen | B60G 21/007 |
| | | | 180/209 |
| 7,887,070 B2 | 2/2011 | Kirchner | |
| 7,896,360 B2 | 3/2011 | Buma | |
| 7,914,020 B2 | 3/2011 | Boston | |
| 7,946,596 B2 | 5/2011 | Hsu et al. | |
| 7,967,306 B2 | 6/2011 | Mighell | |
| 8,016,302 B1 | 9/2011 | Reeve | |
| 8,050,820 B2 | 11/2011 | Yanaka et al. | |
| 8,070,172 B1 | 12/2011 | Smith et al. | |
| 8,104,781 B2 | 1/2012 | Gazarek | |
| 8,260,504 B2 | 9/2012 | Tsujii et al. | |
| 8,262,111 B2 | 9/2012 | Lucas | |
| 8,345,096 B2 | 1/2013 | Ishiyama et al. | |
| 8,641,064 B2 | 2/2014 | Krajekian | |
| 8,651,503 B2 | 2/2014 | Rhodig | |
| 8,818,700 B2 | 8/2014 | Moulene et al. | |
| 8,925,940 B2 | 1/2015 | Michell | |
| 9,045,015 B2 | 6/2015 | Spahl et al. | |
| 9,090,281 B2 | 7/2015 | Spahl et al. | |
| 9,145,168 B2 | 9/2015 | Spahl et al. | |
| 9,216,763 B2 * | 12/2015 | Huntzinger | B60G 3/08 |
| 9,248,857 B2 | 2/2016 | Spahl et al. | |
| 9,283,989 B2 | 3/2016 | Spahl et al. | |
| 9,296,420 B2 | 3/2016 | Sasaki et al. | |
| 9,493,208 B2 | 11/2016 | Sasaki et al. | |
| 2001/0028154 A1 | 10/2001 | Sebe | |
| 2002/0109310 A1 | 8/2002 | Lim et al. | |
| 2002/0171216 A1 | 11/2002 | Deal | |
| 2002/0190494 A1 * | 12/2002 | Cocco | B60G 21/007 |
| | | | 280/124.135 |
| 2003/0071430 A1 | 4/2003 | Serra et al. | |
| 2003/0102176 A1 | 6/2003 | Bautista | |
| 2003/0141689 A1 | 7/2003 | Hamy | |
| 2003/0197337 A1 | 10/2003 | Dodd et al. | |
| 2004/0051262 A1 | 3/2004 | Young | |
| 2004/0100059 A1 | 5/2004 | Van Den Brink | |
| 2004/0134302 A1 | 7/2004 | Ko et al. | |
| 2004/0199314 A1 | 10/2004 | Meyers et al. | |
| 2004/0236486 A1 | 11/2004 | Krause et al. | |
| 2005/0051976 A1 | 3/2005 | Blondelet et al. | |
| 2005/0082771 A1 | 4/2005 | Oh | |
| 2005/0127656 A1 | 6/2005 | Sato et al. | |
| 2005/0184476 A1 | 8/2005 | Hamm | |
| 2005/0199087 A1 | 9/2005 | Li et al. | |
| 2005/0206101 A1 | 9/2005 | Bouton | |
| 2005/0275181 A1 | 12/2005 | MacIsaac | |
| 2006/0049599 A1 | 3/2006 | Lehane | |
| 2006/0091636 A1 | 5/2006 | Shelton | |
| 2006/0151982 A1 | 7/2006 | Mills | |
| 2006/0170171 A1 | 8/2006 | Pedersen | |
| 2006/0180372 A1 | 8/2006 | Mercier et al. | |
| 2006/0220331 A1 | 10/2006 | Schafer et al. | |
| 2006/0226611 A1 | 10/2006 | Xiao et al. | |
| 2006/0249919 A1 | 11/2006 | Suzuki et al. | |
| 2006/0276944 A1 | 12/2006 | Yasui et al. | |

(56) References Cited

U.S. PATENT DOCUMENTS

| | | |
|---|---|---|
| 2007/0029751 A1* | 2/2007 | Marcacci .............. B62D 9/02 |
| | | 280/124.1 |
| 2007/0075517 A1 | 4/2007 | Suhre et al. |
| 2007/0078581 A1 | 4/2007 | Nenninger et al. |
| 2007/0126199 A1 | 6/2007 | Peng et al. |
| 2007/0151780 A1 | 7/2007 | Tonoli et al. |
| 2007/0182110 A1 | 8/2007 | Urababa |
| 2007/0182120 A1 | 8/2007 | Tonoli et al. |
| 2007/0193803 A1 | 8/2007 | Geiser |
| 2007/0193815 A1 | 8/2007 | Hobbs |
| 2007/0228675 A1 | 10/2007 | Tonoli et al. |
| 2007/0241522 A1 | 10/2007 | Tsai |
| 2008/0001377 A1* | 1/2008 | Rogic .............. B60G 3/14 |
| | | 280/124.125 |
| 2008/0012262 A1 | 1/2008 | Carabelli et al. |
| 2008/0033612 A1 | 2/2008 | Raab |
| 2008/0100018 A1 | 5/2008 | Dieziger |
| 2008/0114509 A1 | 5/2008 | Inoue et al. |
| 2008/0115994 A1* | 5/2008 | Martini .............. B62D 9/02 |
| | | 180/210 |
| 2008/0135320 A1 | 6/2008 | Matthies |
| 2008/0164085 A1 | 7/2008 | Cecinini |
| 2008/0197597 A1 | 8/2008 | Moulene et al. |
| 2008/0197599 A1 | 8/2008 | Comstock et al. |
| 2008/0223634 A1 | 9/2008 | Yamamoto et al. |
| 2008/0227365 A1 | 9/2008 | Lo |
| 2008/0238005 A1 | 10/2008 | James |
| 2008/0255726 A1 | 10/2008 | Fischlein et al. |
| 2008/0258416 A1 | 10/2008 | Wilcox |
| 2008/0272562 A1 | 11/2008 | Sabelstrom et al. |
| 2009/0026719 A1* | 1/2009 | Koch .............. B60G 7/006 |
| | | 280/5.508 |
| 2009/0085311 A1 | 4/2009 | Kim et al. |
| 2009/0105906 A1 | 4/2009 | Hackney et al. |
| 2009/0108555 A1 | 4/2009 | Wilcox |
| 2009/0171530 A1 | 7/2009 | Bousfield |
| 2009/0194961 A1 | 8/2009 | Dieziger |
| 2009/0194965 A1 | 8/2009 | Boston |
| 2009/0197731 A1* | 8/2009 | Kobler .............. F16H 29/04 |
| | | 475/166 |
| 2009/0289437 A1 | 11/2009 | Steinhilber |
| 2009/0299565 A1 | 12/2009 | Hara et al. |
| 2009/0312908 A1 | 12/2009 | Van Den Brink |
| 2009/0314566 A1 | 12/2009 | Rust |
| 2009/0315282 A1 | 12/2009 | Kirchner |
| 2010/0025944 A1 | 2/2010 | Hara et al. |
| 2010/0030441 A1 | 2/2010 | Kosaka |
| 2010/0032914 A1 | 2/2010 | Hara et al. |
| 2010/0032915 A1 | 2/2010 | Hsu et al. |
| 2010/0044977 A1 | 2/2010 | Hughes et al. |
| 2010/0044979 A1 | 2/2010 | Haeusler et al. |
| 2010/0152987 A1 | 6/2010 | Gorai |
| 2010/0219600 A1 | 9/2010 | Dada |
| 2011/0006498 A1 | 1/2011 | Mercier |
| 2011/0095494 A1 | 4/2011 | White |
| 2011/0148052 A1 | 6/2011 | Quemere |
| 2011/0215544 A1 | 9/2011 | Rhodig |
| 2011/0254238 A1 | 10/2011 | Kanou |
| 2012/0098225 A1 | 4/2012 | Lucas |
| 2012/0248717 A1 | 10/2012 | Tsujii et al. |
| 2013/0062133 A1* | 3/2013 | Budweil .............. B60B 35/1063 |
| | | 180/209 |
| 2013/0068550 A1 | 3/2013 | Gale |
| 2013/0127131 A1* | 5/2013 | Michel .............. B60G 11/183 |
| | | 280/124.106 |
| 2013/0153311 A1 | 6/2013 | Huntzinger |
| 2013/0168934 A1 | 7/2013 | Krajekian |
| 2014/0252730 A1 | 9/2014 | Spahl et al. |
| 2014/0252731 A1 | 9/2014 | Spahl et al. |
| 2014/0252732 A1 | 9/2014 | Spahl et al. |
| 2014/0252733 A1 | 9/2014 | Spahl et al. |
| 2014/0252734 A1 | 9/2014 | Spahl et al. |
| 2014/0312580 A1* | 10/2014 | Gale .............. B60G 21/073 |
| | | 280/5.509 |
| 2014/0346753 A1 | 11/2014 | Huang et al. |
| 2014/0353937 A1* | 12/2014 | Girelli |
| | | Consolaro .......... B60G 21/0551 |
| | | 280/124.128 |
| 2014/0365078 A1 | 12/2014 | Gerecke et al. |
| 2015/0045171 A1* | 2/2015 | Schimpf .............. F16H 48/295 |
| | | 475/249 |
| 2015/0094909 A1* | 4/2015 | Illg .............. B60G 17/0162 |
| | | 701/37 |
| 2016/0009180 A1 | 1/2016 | Barrass |
| 2016/0059661 A1 | 3/2016 | Saeger et al. |
| 2016/0059923 A1 | 3/2016 | Simon et al. |
| 2016/0144680 A1* | 5/2016 | Simon .............. B60G 3/20 |
| | | 280/124.103 |
| 2016/0243918 A1 | 8/2016 | Spahl et al. |

FOREIGN PATENT DOCUMENTS

| | | |
|---|---|---|
| DE | 1937578 U | 1/1963 |
| DE | 6801096 U | 11/1967 |
| DE | 4035128 A1 | 6/1992 |
| DE | 4135585 A1 | 5/1993 |
| DE | 4236328 C1 | 9/1993 |
| DE | 4315017 C1 | 9/1994 |
| DE | 19621947 C1 | 10/1997 |
| DE | 19735912 A1 | 3/1998 |
| DE | 19717418 C1 | 10/1998 |
| DE | 19800292 A1 | 6/1999 |
| DE | 19848294 A1 | 10/1999 |
| DE | 19838328 C1 | 12/1999 |
| DE | 19846275 A1 | 12/1999 |
| DE | 19831162 A1 | 7/2000 |
| DE | 10251946 B3 | 3/2004 |
| DE | 10349655 A1 | 6/2005 |
| DE | 102004027202 A1 | 10/2005 |
| DE | 102004058523 A1 | 6/2006 |
| DE | 102007006546 A1 | 8/2007 |
| DE | 112006002581 T5 | 9/2008 |
| DE | 102007024769 A1 | 11/2008 |
| DE | 102008046588 A1 | 3/2010 |
| DE | 102009042662 A1 | 3/2011 |
| DE | 102010000884 A1 | 7/2011 |
| DE | 102010000886 A1 | 7/2011 |
| DE | 102010055947 A1 | 8/2011 |
| DE | 102010011404 A1 | 3/2012 |
| DE | 102010046317 A1 | 3/2012 |
| DE | 102012217416 A1 | 3/2014 |
| EP | 0592377 A1 | 4/1994 |
| EP | 0606191 A1 | 7/1994 |
| EP | 0626307 A1 | 11/1994 |
| EP | 0658453 A2 | 6/1995 |
| EP | 1030790 A1 | 8/2000 |
| EP | 1142779 A2 | 10/2001 |
| EP | 1153773 A2 | 11/2001 |
| EP | 1155950 A2 | 11/2001 |
| EP | 1180476 A1 | 2/2002 |
| EP | 1228905 A2 | 8/2002 |
| EP | 1346907 A2 | 9/2003 |
| EP | 1348617 A1 | 10/2003 |
| EP | 1419909 A2 | 5/2004 |
| EP | 1539563 A1 | 6/2005 |
| EP | 1600313 A1 | 11/2005 |
| EP | 1630081 A1 | 3/2006 |
| EP | 1702773 A2 | 9/2006 |
| EP | 1798081 A1 | 6/2007 |
| EP | 1872981 A1 | 1/2008 |
| EP | 1773609 B1 | 3/2008 |
| EP | 1944228 A1 | 7/2008 |
| EP | 2030814 A2 | 3/2009 |
| EP | 2077223 A1 | 7/2009 |
| EP | 2199122 A1 | 6/2010 |
| EP | 2213561 A1 | 8/2010 |
| EP | 2475570 B1 | 7/2012 |
| EP | 2712796 A2 | 4/2014 |
| ES | 2284383 A1 | 1/2007 |
| FR | 2663283 A1 | 12/1991 |
| FR | 2768203 A1 | 3/1999 |
| FR | 2858963 A1 | 2/2005 |

(56) References Cited

FOREIGN PATENT DOCUMENTS

| | | |
|---|---|---|
| FR | 2872699 A1 | 1/2006 |
| FR | 2927026 A1 | 8/2009 |
| FR | 2937000 A1 | 4/2010 |
| FR | 2946944 A1 | 12/2010 |
| FR | 2961746 A1 | 12/2011 |
| GB | 480191 A | 2/1938 |
| GB | 1157016 A | 7/1969 |
| GB | 2322837 A | 9/1998 |
| GB | 2382334 A | 11/2001 |
| GB | 2374327 A | 10/2002 |
| GB | 2390065 A | 12/2003 |
| GB | 2394701 A | 5/2004 |
| GB | 2444250 A | 6/2008 |
| GB | 2450740 A | 1/2009 |
| GB | 2472180 A | 2/2011 |
| GB | 2476877 A | 7/2011 |
| GB | 2492757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006248489 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| JP | 2011230727 A | 11/2011 |
| JP | 2012153349 A | 8/2012 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | 2009/106978 A1 | 9/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011005945 A1 | 1/2011 |
| WO | 2011/023862 A1 | 3/2011 |
| WO | 2011029795 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011102108 A1 | 8/2011 |
| WO | 2011/107674 A1 | 9/2011 |
| WO | 2012031150 A2 | 3/2012 |
| WO | 2014009637 A1 | 1/2014 |

OTHER PUBLICATIONS

Notice of Allowance dated Sep. 28, 2015 for patented U.S. Appl. No. 14/201,586.
Notice of Allowance dated Feb. 3, 2015 for patented U.S. Appl. No. 14/201,602.
Notice of Allowance dated May 20, 2015 for patented U.S. Appl. No. 14/201,616.
Advisory Action dated Oct. 7, 2015 for co-pending U.S. Appl. No. 14/201,628.
Notice of Allowance dated Nov. 3, 2015 for co-pending U.S. Appl. No. 14/201,628.
Office Action dated Nov. 6, 2015 for co-pending U.S. Appl. No. 14/554,410.
Machine translation of German Examination Report dated May 28, 2015 for German Application No. 102014217386.8.
Machine translation of German Examination Report dated Apr. 30, 2015 for German Application No. 102014217246.2.
United Kingdom Search Report for related Application No. GB1520837.4, dated Apr. 13, 2016.
Office Action from co-pending U.S. Appl. No. 14/554,410.
Further United Kingdom Search Report for related Application No. GB1520837.4, dated May 4, 2016.
German Search Report for Application No. 10 2013 203 923.9 dated Oct. 8, 2013.
German Search Report for Application No. 10 2013 203 922.0 dated Oct. 14, 2013.
German Search Report for Application No. 10 2013 203 927.1 dated Nov. 5, 2013.
German Search Report for Application No. 10 2013 203 926.3 dated Oct. 31, 2013.
German Search Report for Application No. 10 2013 203 924.7 dated Oct. 24, 2013.
Office Action dated Nov. 28, 2014 for patented U.S. Appl. No. 14/201,550.
Office Action dated Oct. 10, 2014 for co-pending U.S. Appl. No. 14/201,602.
Office Action dated Sep. 4, 2014 for co-pending U.S. Appl. No. 14/201,628.
Office Action dated Dec. 26, 2014 for co-pending U.S. Appl. No. 14/201,628.
Office Action dated Mar. 11, 2015 for co-pending U.S. Appl. No. 14/201,628.
Office Action dated Jan. 29, 2015 for patented U.S. Appl. No. 14/201,616.
Office Action dated Dec. 19, 2014 for co-pending U.S. Appl. No. 14/201,586.
Office Action dated Jun. 1, 2015 for co-pending U.S. Appl. No. 14/201,586.
Office Action dated Jul. 28, 2015 for co-pending U.S. Appl. No. 14/201,628.
Non-Final Office Action dated Jun. 27, 2016 from co-pending U.S. Appl. No. 14/630,070.
Non-Final Office Action dated Aug. 3, 2016 from co-pending U.S. Appl. No. 14/554,410.
Non-Final Office Action dated Dec. 19, 2016 from co-pending U.S. Appl. No. 14/839,137.

(56) References Cited

OTHER PUBLICATIONS

Final Office Action dated Dec. 19, 2016 from co-pending U.S. Appl. No. 14/630,070.
Non-Final Office Action dated Jan. 5, 2017 from co-pending U.S. Appl. No. 14/842,099.
Notice of Allowance dated Jan. 27, 2017 from co-pending U.S. Appl. No. 14/554,410.
Chinese Notification of First Office Action for related Application No. CN201410083843.2, dated Mar. 24, 2017.
Chinese Notification of First Office Action for related Application No. CN201410083467.7, dated Mar. 24, 2017.
Advisory Action dated Mar. 29. 2017 from co-pending U.S. Appl. No. 14/630,070.
Chinese Notification of First Office Action for related Application No. CN201410083008.9, dated Apr. 6, 2017.
Non-Final Office Action dated Apr. 27, 2017 from co-pending U.S. Appl. No. 14/630,070.
Chinese Notification of First Office Action for related Application No. CN201410082053.2, dated Apr. 27, 2017.
Chinese Notification of First Office Action for related Application No. CN201410081761.4, dated Mar. 29, 2017.
Final Office Action dated Jun. 7, 2017 from co-pending U.S. Appl. No. 14/839,137.
Notice of Allowance dated Jul. 3, 2017 from co-pending U.S. Appl. No. 14/842,099.
Notice of Allowance dated Aug. 21, 2017 from co-pending U.S. Appl. No. 14/839,137.
Notice of Allowance dated May 11, 2007 from co-pending U.S. Appl. No. 14/554,410.

\* cited by examiner

REAR SUSPENSION SYSTEMS WITH ROTARY DEVICES FOR LATERALLY TILTABLE MULTITRACK VEHICLES

TECHNICAL FIELD

The present disclosure relates generally to laterally tiltable multitrack vehicles, such as, for example, motor vehicles, and more particularly to rear suspensions for laterally tiltable multitrack vehicles that utilize rotary devices.

BACKGROUND

In recent years, interest in motor vehicles with innovative designs has grown in view of the continued expansion of urban areas, the large number of vehicles operating in these areas, and the problems associated therewith, including, for example, traffic jams, parking shortages, and environmental pollution. One solution to such problems (i.e., parking and congestion) is to design vehicles in a manner that permits a plurality of vehicles to share a parking space or a driving lane. In order for such a solution to be feasible, however, such vehicles must be small and, in particular, narrow. Accordingly, vehicles of this type are usually sized to carry no more than one to two persons. Additionally, due to their small size and low weight, such vehicles generally require less engine power output than conventional motor vehicles, which may also reduce the emissions caused by such vehicles without compromising the driving performance of the vehicles.

In recent years, various attempts have therefore been made to develop a laterally tiltable multitrack vehicle, having either three or four wheels, in which the entire vehicle or a part thereof may tilt in toward a rotation center (e.g., a curve bend inner side) in a similar manner to a bicycle or motorcycle. In other words, both the body and wheels of a tiltable vehicle may lean into a curve during cornering such that the wheels stay parallel to the body throughout the curve. Accordingly, like a bicycle or motorcycle, such vehicles are statically in an instable equilibrium and would fall over without any external correction by the driver or another device. Unlike a bicycle or motorcycle, however, in which the vehicle can be easily stabilized by moving the center of gravity of the driver (i.e., via input from the driver), such tiltable multitrack vehicles generally require suspensions that can help stabilize the vehicle during cornering, or, for example, on banked roads.

Accordingly, various innovative suspensions also have been developed for laterally tiltable multitrack vehicles. Such suspensions, for example, generally incorporate a balancing device that can create a torque to influence the leaning angle of the vehicle. Additionally, for safety and ride comfort, such suspensions should also provide a spring/damping function between the body of the vehicle and the wheels of the vehicle, similar to the suspension spring/damper elements of a conventional motor vehicle.

It may, therefore, be desirable to provide a rear suspension system for a laterally tiltable multitrack vehicle that provides both a balancing function and a spring/damping function. It may be further desirable to provide a rear suspension system that provides a spring/damping function that does not compromise the system's balancing function to allow both weight and cost optimized suspension components.

SUMMARY

In accordance with various exemplary embodiments, a suspension system for a laterally tiltable, multitrack vehicle may include a balancer system extending between first and second trailing arms. The suspension system may further include a rotary device acting between the trailing arms. One of the balancer system and the rotary device may be configured to provide a torque to influence a leaning angle of the vehicle and the other of the balancer system and the rotary device may be configured to suppress resonant vertical motion of the vehicle.

In accordance with various additional exemplary embodiments, a rear suspension system for a laterally tiltable, multitrack vehicle may include first and second trailing arms. Each trailing arm may extend between a rear wheel of the vehicle and a frame rail of the vehicle. The suspension system may also include a balancer system extending between the trailing arms. The balancer system may be configured to create a torque to influence a leaning angle of a body of the vehicle. The suspension system may further include a rotary device acting between the trailing arms. The rotary device may be configured to suppress a resonant vertical motion of the body of the vehicle.

In accordance with various additional exemplary embodiments, a rear suspension system for a laterally tiltable, multitrack vehicle may include first and second trailing arms. Each trailing arm may extend between a rear wheel of the vehicle and a frame rail of the vehicle. The suspension system may also include a balancer system extending between the trailing arms. The balancer system may be configured to suppress a resonant vertical motion of a body of the vehicle. The suspension system may further include a rotary device acting between the trailing arms. The rotary device may be configured to create a torque to influence a leaning angle of the body of the vehicle.

In accordance with various further exemplary embodiments, a method of stabilizing a tiltable, multitrack vehicle may include distributing a first load, during a roll motion of the vehicle, via a first mechanism positioned within a rear suspension of the vehicle to influence a leaning angle of the vehicle. The method may further include distributing a second load, during a jounce/rebound motion of the vehicle, via a second mechanism positioned within the rear suspension of the vehicle to suppress a resonant vertical motion of the vehicle. The second mechanism may provide a different load path than the first mechanism.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates a rear suspension system for a laterally tiltable, multitrack vehicle that has independent leaning and spring/damper functions. In this manner, the suspension system may provide both functions (i.e., leaning and damping), without compromising the performance of either function. For instance, the exemplary embodiments described herein may utilize both a balancing actuator and at least one spring/damper element, while providing a separate load path for each function. Various exemplary embodiments described herein, for example, contemplate a rear suspension system comprising a balancer system to provide one of the leaning and damping functions, and a rotary device to provide the other function. In various embodiments, for example, the balancer system may provide the leaning function via a balancing actuator, while the rotary device functions as a spring/damper element. And, in various additional embodiments, the balancer system may instead provide the damping function via at least one spring/damper element, while the rotary device functions as a balancing actuator.

Figure 1:
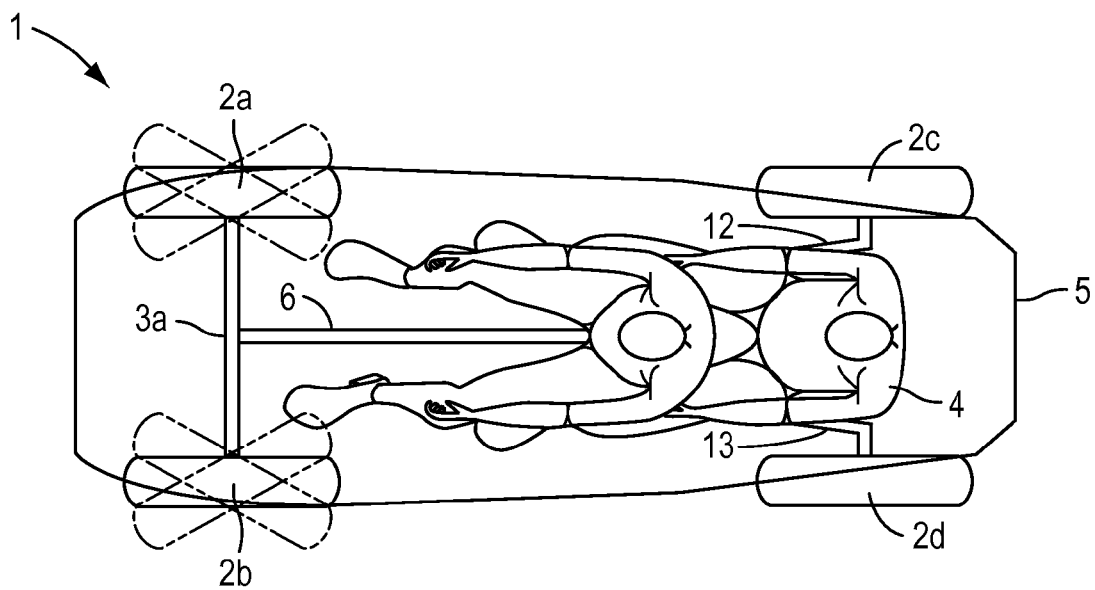
FIG. 1 is a plan view of an exemplary embodiment of a multitrack, laterally tiltable vehicle in accordance with the present disclosure.
Figure 2:
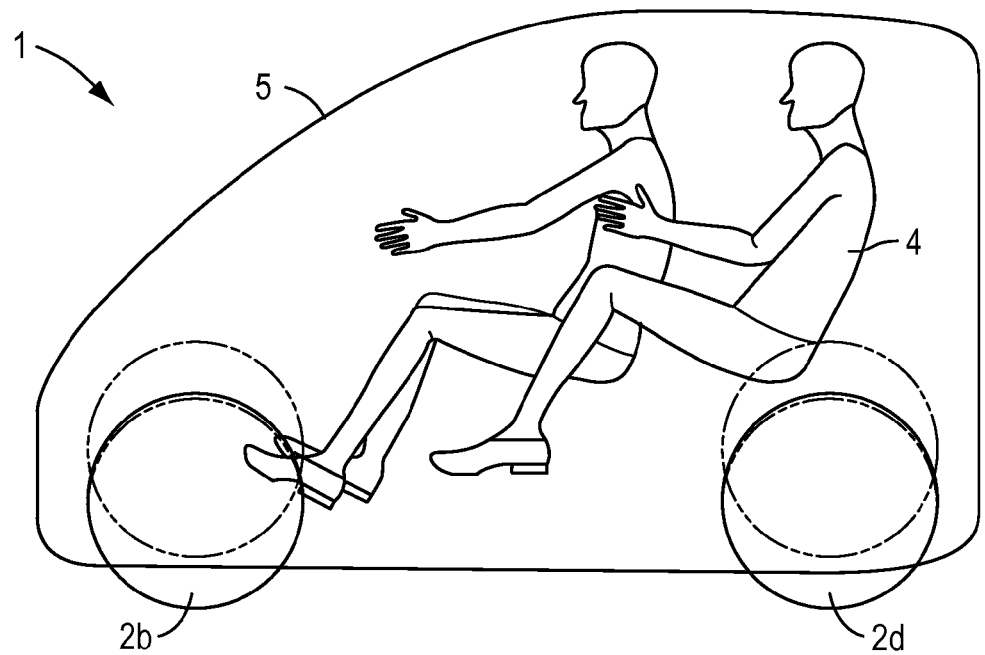
FIG. 2 is a side view of the multitrack, laterally tiltable vehicle of FIG. 1.
Figure 3:
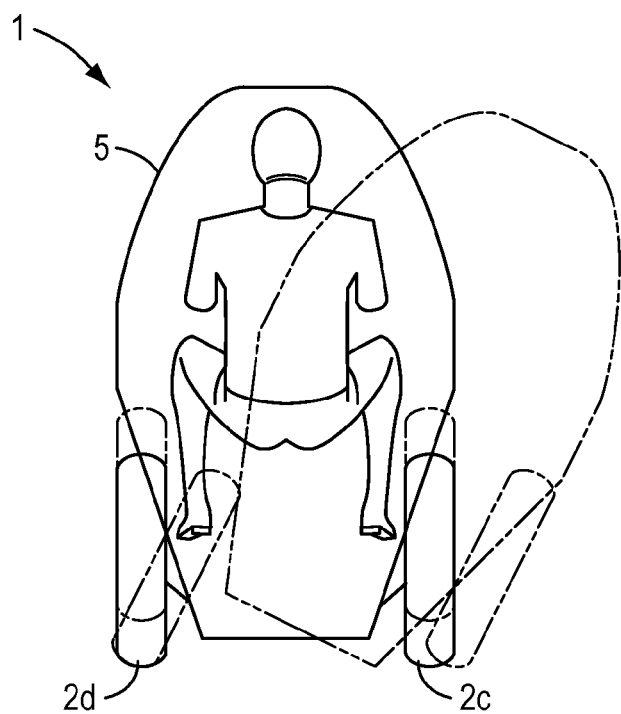
FIG. 3 is a rear view of the multitrack, laterally tiltable vehicle of FIG. 1.

FIGS. 1-3 illustrate an exemplary embodiment of a multitrack, laterally tiltable vehicle in accordance with the present disclosure. As shown in FIGS. 1-3, a vehicle 1 may include four wheels 2a, 2b, 2c, and 2d. Front wheel 2a is mounted on the right side of a front axle 3a of the vehicle 1 and front wheel 2b is mounted on the left side of the front axle 3a. Rear wheel 2c is mounted on the right side of the vehicle 1 to a right rear trailing arm 12 of the vehicle 1 and rear wheel 2d is mounted on the left side of the vehicle 1 to a left rear trailing arm of the vehicle 1. In various embodiments, the vehicle 1 is designed for transporting one to two persons or occupants 4. As shown in the exemplary embodiment of FIGS. 1-3, in accordance with various exemplary embodiments, the vehicle 1 may be designed such that the two occupants 4 sit one behind the other in the vehicle 1. In accordance with various additional embodiments, the vehicle 1 may also have a closed body 5 that forms a cabin to protect the occupants 4, for example, from weather, and provides additional protection in the event of an accident.

Those of ordinary skill in the art would understand that the vehicle 1 illustrated in FIGS. 1-3 is exemplary only and intended to illustrate one embodiment of a multitrack, laterally tiltable vehicle in accordance with the present disclosure. Accordingly, multitrack, laterally tiltable vehicles in accordance with the present disclosure may have various body designs, occupant configurations, and numbers and/or configurations of wheels without departing from the scope of the present disclosure and claims. For example, although the vehicle illustrated and described with reference to FIGS. 1-3 includes four wheels 2a, 2b, 2c, and 2d, various additional embodiments of the present disclosure contemplate a vehicle that has only three wheels. Furthermore, those of ordinary skill in the art would understand that the vehicle 1, may have any type of motor or power source known to those of ordinary skill, including, but not limit to, an electric motor, a combustion engine, or a combination thereof (i.e., a hybrid drive).

As shown in the rear view of FIG. 3, both the vehicle body 5 and the wheels 2a, 2b, 2c, and 2d may tilt during the lateral tilting of the vehicle 1. In other words, both the body 5 and the wheels 2a, 2b, 2c, and 2d may lean into a curve during the cornering of the vehicle 1 such that the wheels 2a, 2b, 2c, and 2d stay mainly parallel to the body 5 throughout the curve. Accordingly, as such, vehicle 1 is statically in an instable equilibrium, and may fall over without an external correction. Thus, as above, vehicle 1 requires a suspension system, such as, for example, a rear suspension system, that can help stabilize the vehicle during cornering and provide increased safety and ride comfort (i.e., through the damping of vehicle jounce/rebound motion).

Figure 4:
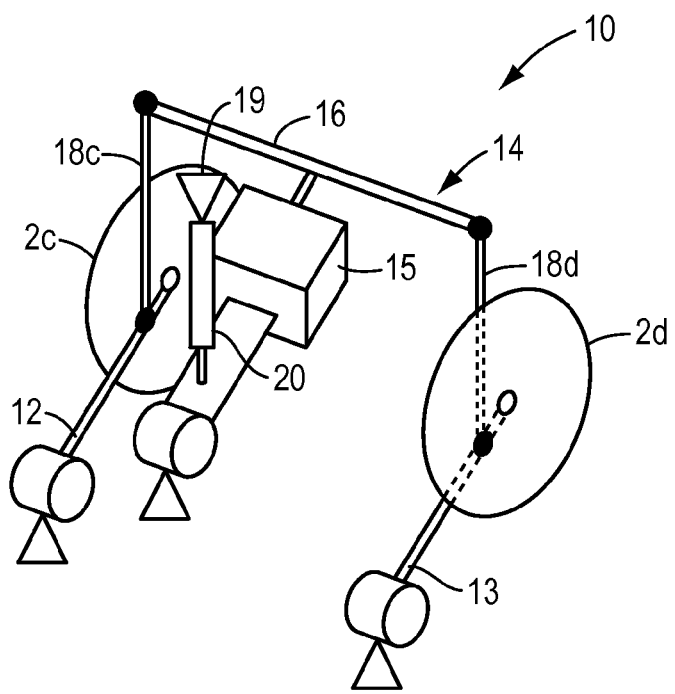
FIG. 4 is a schematic view of a conventional rear suspension system within the multitrack, laterally tiltable vehicle of FIG.
Figure 5:
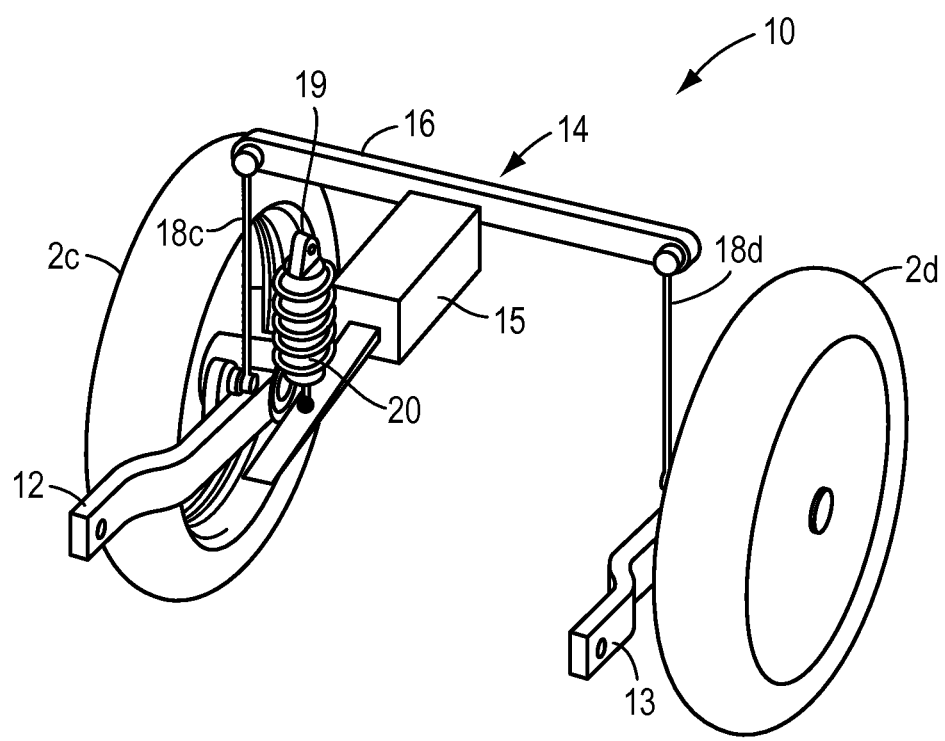
FIG. 5 is a perspective view of the conventional rear suspension system of FIG. 4.

FIGS. 4 and 5 illustrate an exemplary arrangement of the components of a conventional rear suspension system for a multitrack, laterally tiltable vehicle such as the vehicle 1. The suspension system 10 includes a pair of trailing arms 12, 13 respectively connected to the rear wheels 2c, 2d of the vehicle 1, and a balancer system 14 that is connected to the trailing arms 12, 13 via, for example, a pair of respective links 18c, 18d. The balancer system 14 includes, for example, an actuator (i.e., torque device) 15, which is connected to a balancer control arm 16 and to the body 5 of the vehicle 1 (e.g., at a body mount 19) via, for example, a spring/damper element 20. The balancer control arm 16 extends between the trailing arms 12, 13 of the suspension system 10. In this manner, as would be understood by those of ordinary skill in the art, the balancer system 14 may create a leaning torque via the actuator 15 to influence a leaning angle of the vehicle 1. As above, to suppress vibration of the vehicle 1, the suspension system 10 may also include at least one spring/damper element 20 that is positioned between the balancer control arm 16 and the body 5 of the vehicle 1. As would be understood by those of ordinary skill in the art, however, this configuration links the balancer control arm 16 to the spring/damper element 20 such that the balancer 16 must also carry the suspension and road loads of the spring/damper element 20. In other words, all the vertical forces that go into the spring/damper element 20 also go into the balancer control arm 16.

Figure 6:
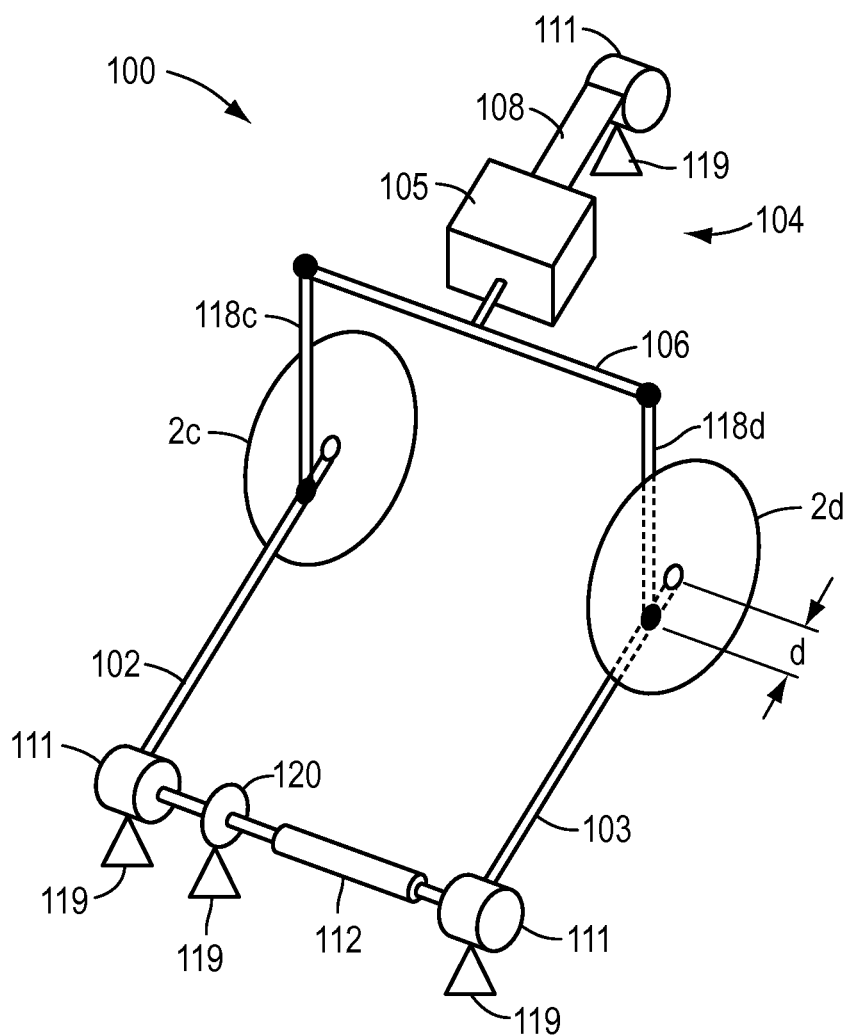
FIG. 6 is a schematic view of an exemplary embodiment of a rear suspension system for use within the multitrack, laterally tiltable vehicle of FIG. 1, in accordance with the present disclosure.
Figure 7:
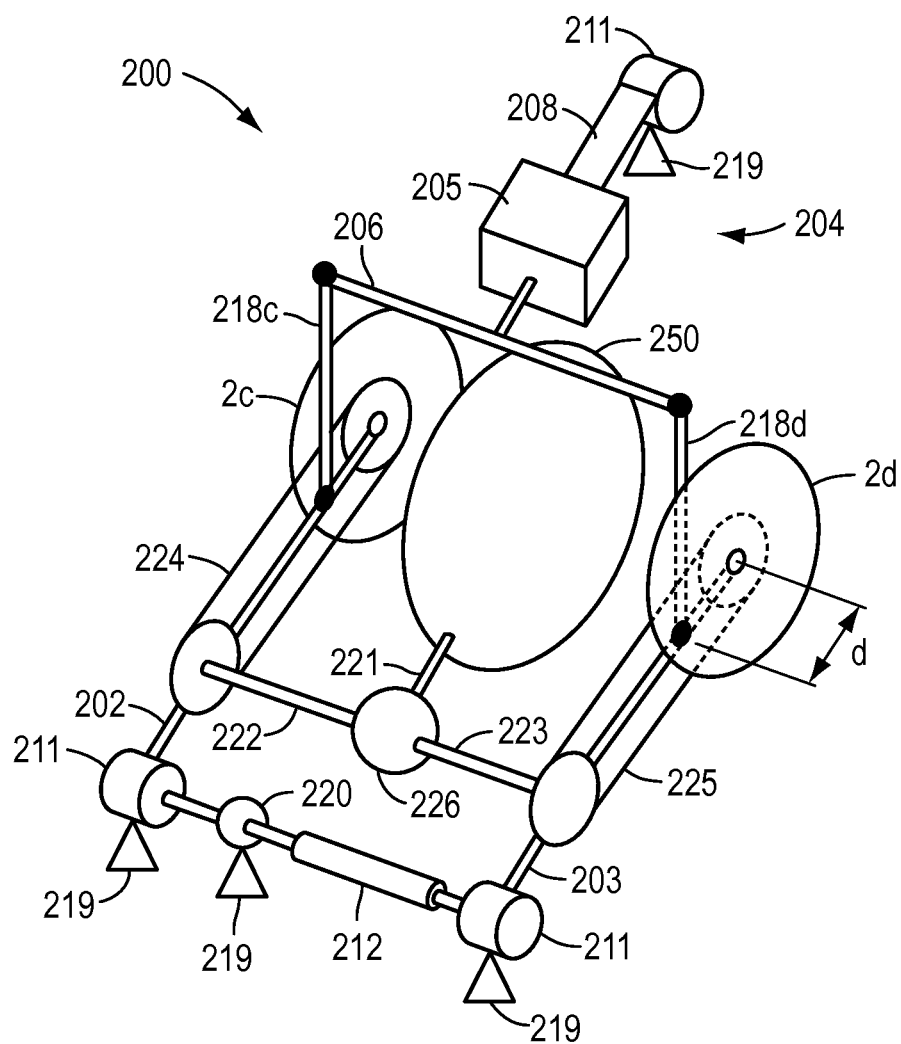
FIG. 7 is a schematic view of another exemplary embodiment of a rear suspension system for use within the multitrack, laterally tiltable vehicle of FIG. 1, in accordance with the present disclosure.

FIGS. 6 and 7 illustrate exemplary embodiments of a rear suspension system 100, 200 for a multitrack, laterally tiltable vehicle, such as, for example, the vehicle 1, in accordance with the present disclosure. Similar to the conventional suspension system 10 illustrated in FIGS. 4 and 5, the suspension systems 100, 200 include a balancer system 104, 204 comprising an actuator 105, 205 that is configured to create a torque to influence a leaning angle of the vehicle 1 and a spring/damper element 112, 212 that is configured to suppress the otherwise resonant up and down (i.e., vertical) motions of the vehicle 1. Unlike the system 10, however, the suspension systems 100, 200 each provide a separate load path for each of their leaning and spring/damper functions. In accordance with various embodiments, for example, the suspension systems 100, 200 include a balancer system 104, 204 to provide the leaning function, and a rotary device 112, 212 to provide the spring/damper function.

In various exemplary embodiments, the rear suspension systems 100, 200 include first and second trailing arms 102, 103; 202, 203 respectively connected to each wheel 2c, 2d. In accordance with various embodiments, for example, the suspension systems 100, 200 may be in the form of a trailing-arm suspension (or a trailing-link suspension) and may utilize two parallel arms to locate the wheels 2c, 2d. Thus, in accordance with such embodiments, as shown in FIGS. 6 and 7, each trailing arm 102, 103; 202, 203 may also include a joint 111, 211 for mounting (e.g., at a body mount 119, 219) the trailing arm to a frame rail 6 (see FIG. 1) of the vehicle 1.

When the suspension systems 100, 200 are in use, the first and second trailing arms 102, 103; 202; 203 are each respectively connected to a hub (not shown) that is disposed within an internal space of the rear wheels 2c, 2d. Thus, when the suspension systems 100, 200 are in use, the trailing arms 102, 103 are arranged on either side of the frame rail 6 (which is connected to the body 5) of the vehicle 1, such that the first trailing arm 102, 202 extends between the rear wheel 2c and the frame rail 6 and the second trailing arm 103, 203 extends between the rear wheel 2d and the frame rail 6.

As used herein, the term "frame rail" refers to any type of vehicle frame rail, including but not limited to, rails that form the main structure of the chassis (i.e., the body) of the motor vehicle and subframe rails that form frame sections that attach to the chassis.

Those of ordinary skill in the art would understand, however, that the suspension systems 100, 200 of FIGS. 6 and 7 are exemplary only in that the trailing arms 102, 103; 202; 203 may have various alternative configurations (i.e., shapes and/or cross-sections), lengths, dimensions, and/or connection/mounting points without departing from the scope of the present disclosure and claims. Those of ordinary skill in the art would understand, for example, that the longitudinal length d between the balancer interface (e.g., where connecting rods 118c, 118d; 218c, 218c interface with the trailing arms 102, 103; 202, 203) and the wheel hub may vary and may be chosen based upon a particular suspension application and the available package space within the vehicle.

The trailing arms 102, 103; 202, 203 may also be configured to connect to the rear wheels 2c, 2d and the frame rail 6 via any method and/or technique known to those of ordinary skill in the art. Furthermore, when the suspension systems 100, 200 are in use, the trailing arms 102, 103; 202, 203 may be configured to connect to various types of power train assemblies for driving the vehicle 1. As shown in FIG. 6, for example, in various embodiments, the vehicle 1 may include in-wheel motors (not shown), as would be understood by those of ordinary skill in the art. As shown in FIG. 7, in various additional embodiments, the vehicle 1 may include first and second drive shafts 222, 223 respectively connected to drive belts 224, 225 (which are in turn connected to respective wheels 2c, 2d of the vehicle 1), and a powertrain differential 226 acting between the drive shafts 222, 223 that is connected to an engine/transmission 250 of the vehicle 1 via a prop shaft 221.

The suspension systems 100, 200 also include balancer systems 104, 204 acting between the first and second trailing arms 102, 103; 202, 203. As illustrated in FIGS. 6 and 7, in accordance with various embodiments, each balancer system 104, 204 includes a balancer control arm 106, 206 extending in a transverse direction between the trailing arms 102, 103; 202, 203, a hinged control arm 108, 208 connected to the balancer control arm 106, 206, and an actuator 105, 205 attached to the hinged control arm 108, 208. In various embodiments, for example, the hinged control arm 108, 208 is configured to connect the balancer control arm 106, 206 to the body 5 of the vehicle 1 (via, e.g., a joint 111, 211 and mount 119, 219) and transfer all loads from the body 5 to the balancer control arm 106, 206 while also permitting a jounce/rebound motion of the vehicle 1.

The actuator 105, 205 is also attached to the first hinged control arm 108. In this manner, when the suspension systems 100, 200 are in use, the actuator 105, 205 may apply a torque to the first balancer control arm 106, 206 to rotate the first balancer control arm 106, 206 (e.g., to influence a leaning angle of the vehicle body 5) without being subjected to the loads from the vehicle body 5. In accordance with various embodiments, for example, the first balancer control arm 106, 206 may be pivotally connected to each of the trailing arms 102, 103; 202, 203 via a respective connecting rod 118c, 118d; 218c, 218d. Thus, when the suspension systems 100, 200 are in use, the rotational forces (i.e., counteracting torque) provided by the actuator 105, 205 may be transmitted to the trailing arms 102, 103; 202, 203 (and the wheels 2c, 2d) via the connecting rods 118c, 118d; 218c, 218d.

As used herein, the term "actuator" refers to any type of device or motor that can create a torque, including but not limited to, an electric motor and/or a hydraulic motor. Accordingly, actuators in accordance with the present disclosure may be operated by various sources of energy, including, for example, an electric current, hydraulic fluid pressure, or pneumatic pressure, and may convert that energy into rotational motion.

Each of the suspension systems 100, 200 also includes a rotary device 112, 212 acting between the first and second trailing arms 102, 103; 202, 203. In accordance with various exemplary embodiments, the rotary device 112, 212 includes a rotary spring/damper element 112, 212, which creates a transverse path between the trailing arms 102, 103; 202, 203. As would be understood by those of ordinary skill in the art, the rotary spring/damper elements 112, 212 may comprise various rotary damping mechanisms, including, but not limited to, various liquid based hydraulic mechanisms, such as, for example, vane, dashpot, and magneto rheological damping elements.

As also illustrated in FIGS. 6 and 7, in various exemplary embodiments, to enable independent motion of the wheels 2c, 2d, the suspension systems 100, 200 may further include a gear 120, 220 (e.g., a differential with a fixed cage) that is positioned within the path of the rotary device 112, 212. Accordingly, when the vehicle 1 is leaning into a curve (e.g., leaning to the right), the gear 120, 220 may allow the trailing arm 102, 202 to move up and the trailing arm 103, 203 to move down. Without such a gear, the change caused by the rotation (i.e., during the leaning event) would generate undesirable forces in the spring/damper elements 112, 212, which would impede the vehicle's leaning. In various embodiments, for example, the gear 120, 220 has a ratio of about −1, meaning that the gear 120, 220 may invert the input rotation. In this manner, if the trailing arm 102, 202 moves up, the trailing arm 103, 203 may move down by the same amount. In other words, the gear 120, 220 ensures that the spring/damper elements 112, 212 do not experience any relative rotation to impact the leaning of the vehicle 1.

Those of ordinary skill in the art would understand that the suspension systems 100, 200 of FIGS. 6 and 7 are exemplary only and intended to illustrate various embodiments of a rear suspension system in accordance with the present disclosure, in which a balancer system provides the leaning function for the suspension via a balancing actuator, and a rotary device provides the spring/damping function for the suspension via a rotary spring/damper element.

FIGS. 8-13 illustrate various additional exemplary embodiments of suspension systems 300, 400, 500, 600, and 700 that are contemplated by the present disclosure, in which a balancer system provides the spring/damping function for the suspension via a pair of vertical spring/damper elements, and a rotary device provides the leaning function for the suspension via a rotary actuator.

Figure 12:
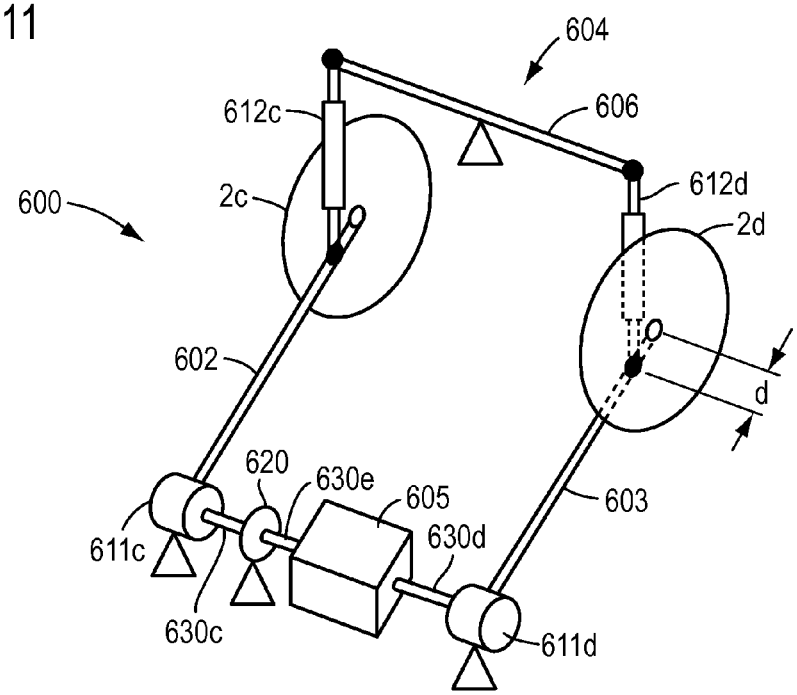
FIG. 12 is a schematic view of yet another exemplary embodiment of a rear suspension system for use within the multitrack, laterally tiltable vehicle of FIG. 1, in accordance with the present disclosure.
Figure 13:
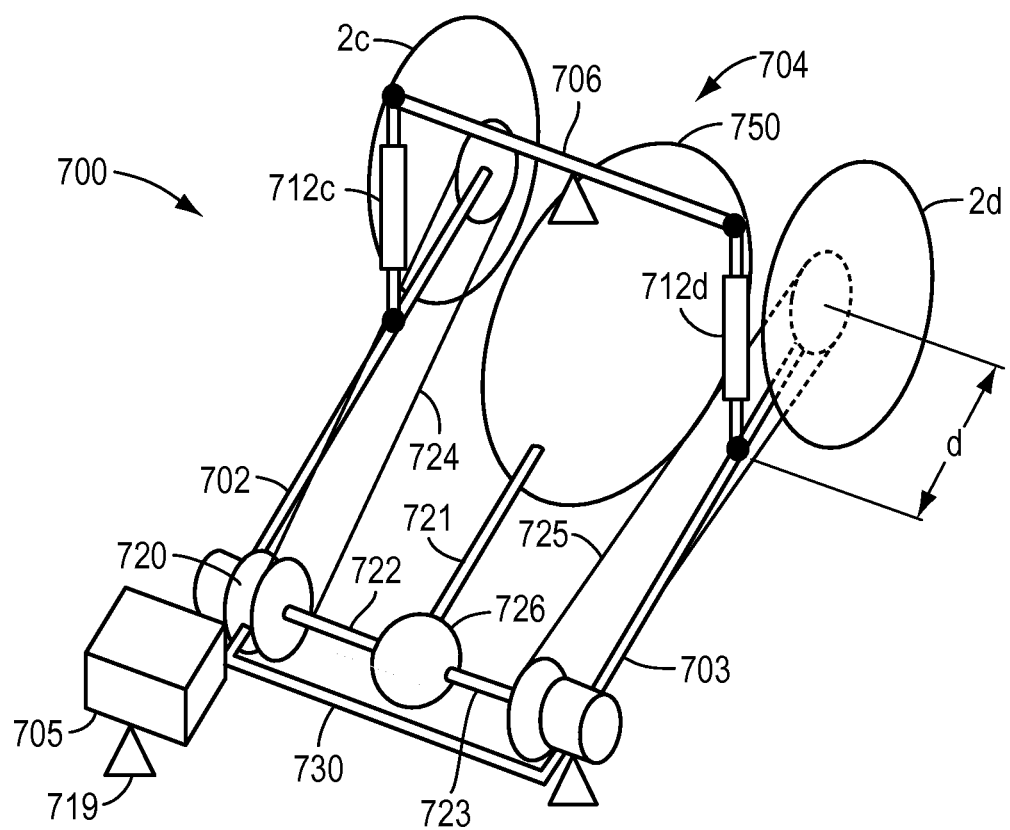
FIG. 13 is a schematic view of yet another exemplary embodiment of a rear suspension system for use within the multitrack, laterally tiltable vehicle of FIG. 1, in accordance with the present disclosure.

FIGS. 8-11 illustrate exemplary embodiments of a rear suspension system 300, 400, 500 for a multitrack, laterally tiltable vehicle (such as, e.g., the vehicle 1), which utilize an axle mounted rotary actuator to provide the suspension's leaning function. And, FIGS. 12 and 13 illustrate exemplary embodiments of a rear suspension system 600, 700 for a multitrack, laterally tiltable vehicle (such as, e.g., the vehicle 1), which utilize a body mounted rotary actuator to provide the suspension's leaning function.

Similar to the suspension systems 100, 200 illustrated in FIGS. 6 and 7, each suspension system 300, 400, 500, 600, 700 includes first and second trailing arms 302, 303; 402, 403; 502, 503; 602, 603; 702, 703 respectively connected to each wheel 2c, 2d. Each suspension system 300, 400, 500, 600, 700 also includes a balancer system 304, 404, 504, 604, 704 acting between the first and second trailing arms 302, 303; 402, 403; 502, 503; 602, 603; 702, 703 and a balancer control arm 306, 406, 506, 606, 706 extending in a transverse direction between the trailing arms 303; 402, 403; 502, 503; 602, 603; 702, 703. Unlike the systems 100, 200, however, each balancer system 304, 404, 504, 604, 704 also includes two vertical spring/damper elements 312c, 312d; 412c, 412d; 512c, 512d; 612c, 612d; 712c, 712d connected to opposite ends of the balancer control arm 306, 406, 506, 606, 706 and extending vertically between the control arm 306, 406, 506, 606, 706 and respective trailing arms 303; 402, 403; 502, 503; 602, 603; 702, 703.

Figure 9:
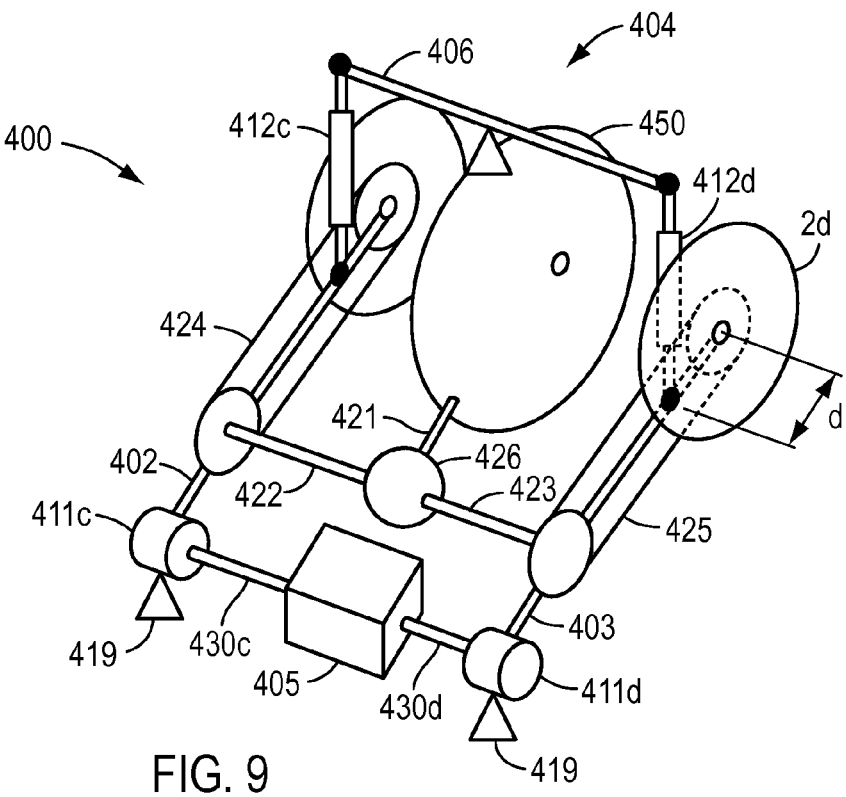
FIG. 9 is a schematic view of yet another exemplary embodiment of a rear suspension system for use within the multitrack, laterally tiltable vehicle of FIG. 1, in accordance with the present disclosure.
Figure 10:
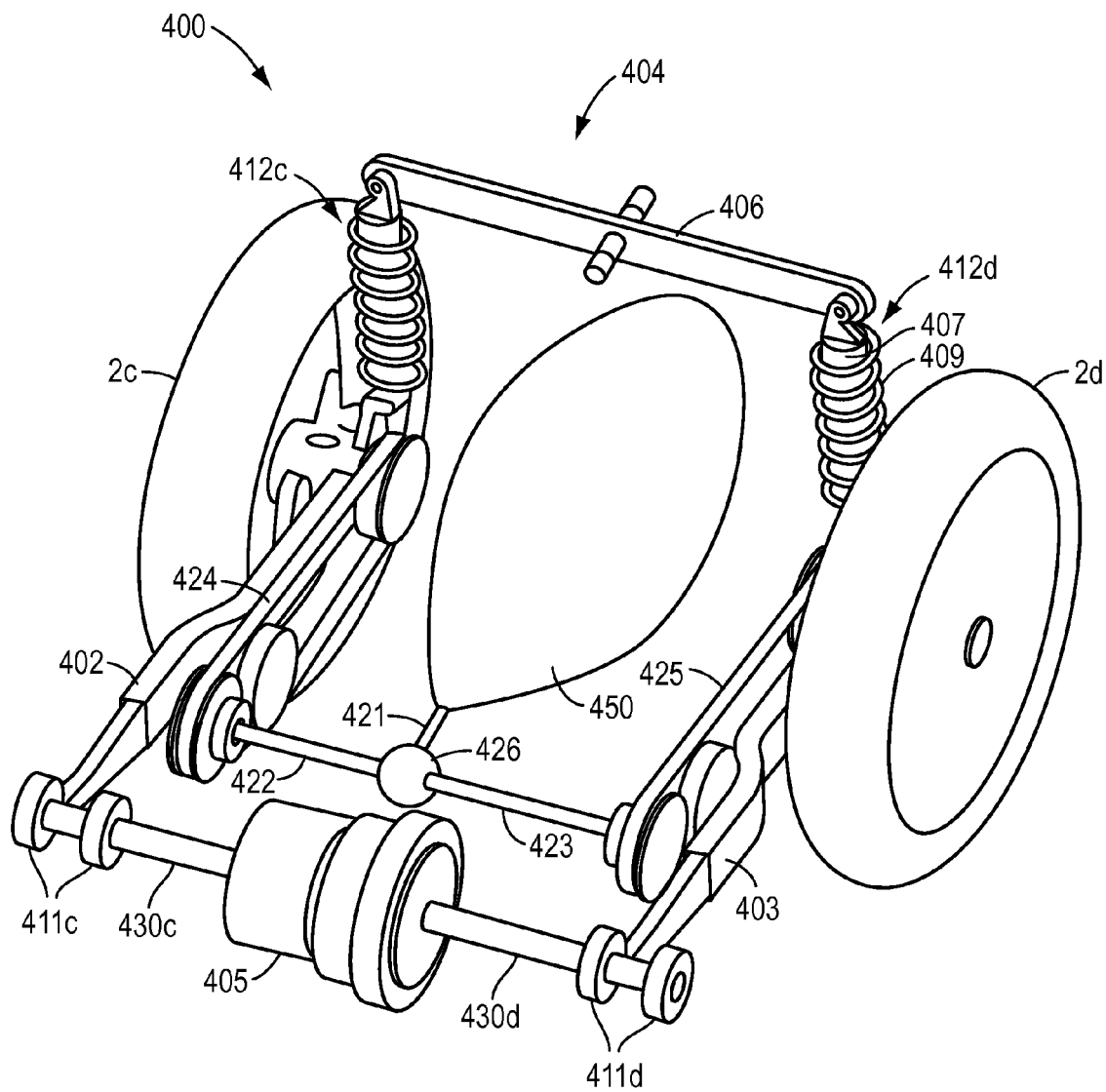
FIG. 10 a perspective view of the suspension system of FIG. 9.

In various embodiments, each spring/damper element 312c, 312d; 412c, 412d; 512c, 512d; 612c, 612d; 712c, 712d may include a shock absorber (e.g., 407 in FIG. 10) and a coil spring (e.g., 409 in FIG. 10). In this manner, when the suspension systems 300, 400, 500, 600, 700 are in use, the spring/damper elements 312c, 312d; 412c, 412d; 512c, 512d; 612c, 612d; 712c, 712d are configured to be compressed and expanded during the jounce/rebound motion of the vehicle 1 to suppress what would otherwise become a resonant up and down motion of the vehicle 1. Thus, in the exemplary embodiments of FIGS. 8-13, each balancer system 304, 404, 504, 604, 704 functions as the spring/damping element instead of the leaning element for each suspension system.

Each of the suspension systems 300, 400, 500, 600, 700 also includes a rotary device 305, 405, 505, 605, 705 acting between the first and second trailing arms 302, 303; 402, 403; 502, 503; 602, 603; 702, 703. With reference to FIGS. 8-11, in accordance with various exemplary embodiments, the rotary device 305, 405, 505 includes a rotary actuator situated between two axle portions, a right axle portion 330c, 430c, 530c and a left axle portion 330d, 430d, 530d. As shown in FIGS. 8-11, the right axle portion 330c, 430c, 530c extends between the trailing arm 302, 402, 502 and the rotary actuator 305, 405, 505, and the left axle portion 330d, 430d, 530d extends between the trailing arm 303, 403, 503 and the rotary actuator 305, 405, 505. In this manner, when the suspension systems 300, 400, 500 are in use, the actuator 305, 405, 505 may apply a torque to cause relative motion between the two axle portions 330c, 330d; 430c, 430d; 530c, 530d, for example, causing the trailing arm 302, 402, 502 to move up and the trailing arm 303, 403, 503 to move down thereby influencing a leaning angle of the vehicle body 5.

Figure 8:
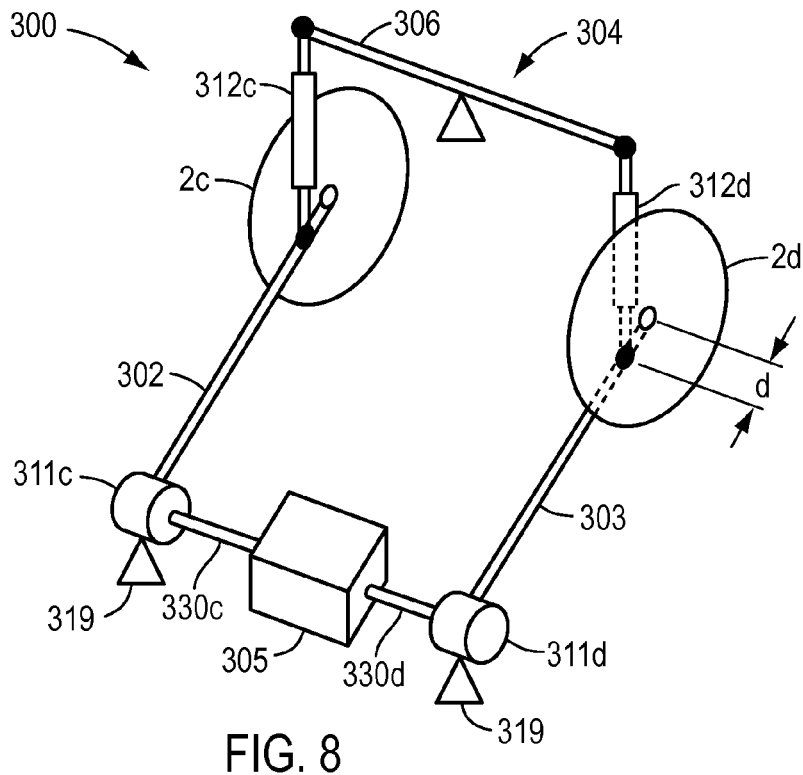
FIG. 8 is a schematic view of yet another exemplary embodiment of a rear suspension system for use within the multitrack, laterally tiltable vehicle of FIG. 1, in accordance with the present disclosure.

As illustrated in FIGS. 8-10, in accordance with various exemplary embodiments, each axle portion 330c, 330d; 430c, 430d may be connected at each of its ends to a respective trailing arm 302, 303; 402, 403 via a respective bearing 311c, 311d; 411c, 411d. For example, as above, the right axle portion 330c, 430c is fixedly coupled to the trailing arm 302, 402, therefore, permitting the actuator 305, 405 to move the trailing arm 302, 402. And, the left axle portion 330d, 430d is fixedly coupled to the trailing arm 303, 403, therefore, permitting the actuator 305, 405 to move the trailing arm 303, 403. As further illustrated in FIGS. 8-10, the axle portions 330c, 330d; 430c, 430d and respective trailing arms 302, 303; 402, 403 are also connected to the body 5 of the vehicle via the respective bearings 311c, 311d; 411c, 411d (e.g., at body mounts 319, 419). Thus, when the suspension systems 300, 400 are in use, the rotational forces (i.e., counteracting torque to offset the leaning of the vehicle body 5) provided by the actuator 305, 405 may be transmitted to the trailing arms 302, 303; 402, 403 (and the wheels 2c, 2d) via the axle portions 330c, 330d; 430c, 430d.

Figure 11:
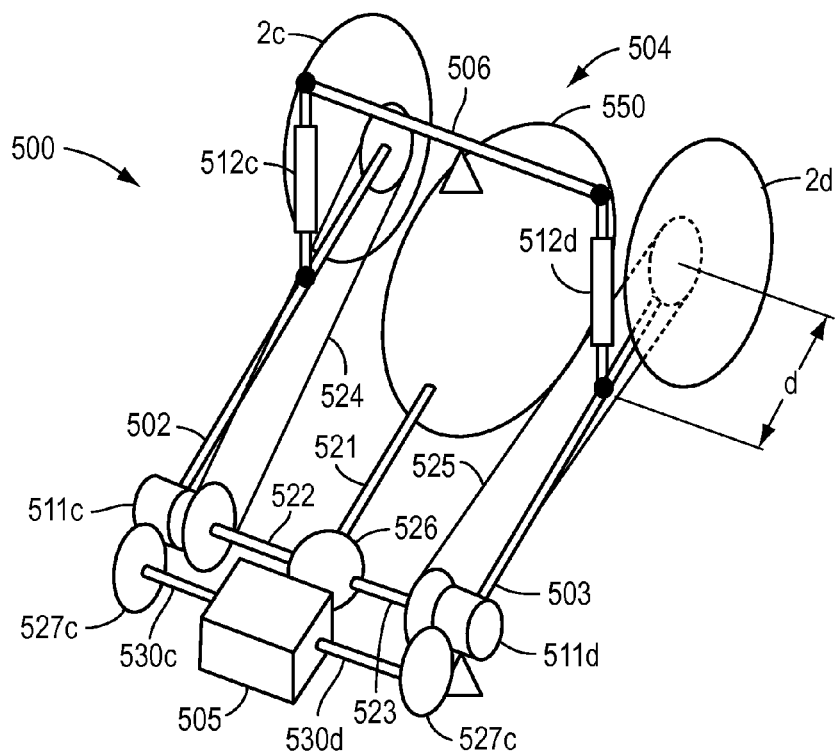
FIG. 11 is a schematic view of yet another exemplary embodiment of a rear suspension system for use within the multitrack, laterally tiltable vehicle of FIG. 1, in accordance with the present disclosure.

In a similar manner, as illustrated in FIG. 11, in various additional embodiments, each axle portion 530c, 530d may be linked at each of its ends to a respective trailing arm 502, 503 (e.g., at a bearing 511c, 511d) via a respective single stage gear 527c, 527d. Accordingly, in such embodiments, the trailing arms 502, 503 may rotate about the bearings 511c, 511d, thereby allowing the actuator 505 to move the trailing arms 502, 503. Thus, when the suspension system 500 is in use, the rotational forces (i.e., counteracting torque) provided by the actuator 505 may be transmitted to the trailing arms 502, 503 (and the wheels 2c, 2d) via the axle portions 530c, 530d.

Furthermore, as illustrated in FIGS. 8-11, when the suspension systems 300, 400, 500 are in use, the trailing arms 302, 303; 402, 403; 502, 503 may be configured to connect to various types of power train assemblies for driving the vehicle 1. As shown in FIG. 8, for example, in various embodiments, the vehicle 1 may include in-wheel motors (not shown), as would be understood by those of ordinary skill in the art.

As shown in FIGS. 9 and 10, in various additional embodiments, the vehicle 1 may include first and second drive shafts 422, 423, for example, with universal joints (not shown) at each end of the shaft to allow independent motion between the shafts. In other words, the joints permit the powertrain connection to handle the relative up and down movement of the shafts 422, 423 (i.e., the motion of the points where the shafts 422, 423 meet the trailing arms 402, 403 relative to the points where the shafts 422, 423 meet a power train differential 426). As illustrated in FIGS. 9 and 10, the drive shafts 422, 423 are respectively connected to drive belts 424, 425, which are in turn connected to respective wheels 2c, 2d of the vehicle 1. The powertrain differential 426 (which is connected to an engine/transmission 450 of the vehicle 1 via a prop shaft 421) connects the drive shafts 422, 423 and drives the shafts 422, 423 to drive the wheels 2c, 2d.

As shown in FIG. 11, in various further embodiments, the vehicle 1 may instead include first and second axles 522, 523 (e.g., without joints) and a powertrain differential 526 acting between the axles 522, 523. Similar to the embodiment of FIGS. 9 and 10, the axles 522, 523 are respectively connected to drive belts 524, 525 (which are in turn connected to respective wheels 2c, 2d of the vehicle 1), and the powertrain differential 526 (which is connected to an engine/transmission 550 of the vehicle 1 via a prop shaft 521) drives the axles 522, 523 to drive the wheels 2c, 2d. In contrast to the embodiment of FIGS. 9 and 10, however, in the embodiment of FIG. 11, since the bearings 511c, 511d are directly connected to the powertrain axles 522, 523 (and the trailing arms respectively rotate around the bearings 511c, 511d), there is no relative motion between the points where the axles 522, 523 meet the trailing arms 502, 503 and the points where the axles 522, 523 meet the power train differential 526. Thus, there is no need to have joints on the axles 522, 523 allow independent motion between the axles. To enable such a configuration, however, a pair of single stage gears 527c, 527d is also required to transfer the motion of the actuator 505 to the trailing arms 502, 503.

With reference to FIGS. 12 and 13, in accordance with various additional exemplary embodiments, the suspension systems 600, 700 may include a rotary actuator 605, 705. As illustrated in FIG. 13, in various embodiments, for example, the rotary actuator 705 may be connected to a body 5 of the vehicle 1 via, for example, a body mount 719. Similar to the embodiments of FIGS. 8-11, when the suspension systems 600, 700 are in use, the actuator 605, 705 may apply a torque to influence a leaning angle of the vehicle body 5 without being subjected to the loads from the vehicle body 5.

As illustrated in FIG. 12, for example, in various embodiments, for a vehicle 1 having a powertrain assembly utilizing in-wheel motors (not shown), the actuator 605 may be positioned between a series of shafts 630c, 630d, and 630e extending between the trailing arms 602, 603. As shown in FIG. 12, the shaft 630c extends between the trailing arm 602 and a gear 620, the shaft 630e extends between the gear 620 and the actuator 605, and the shaft 630d extends between the actuator 605 and the trailing arm 603. The shaft 630c may be pivotally connected to the trailing arm 602 via a bearing 611c, and the shaft 630d may be pivotally connected to the trailing arm 603 via a bearing 611d. Thus, when the suspension system 600 is in use, the rotational forces (i.e., counteracting torque) provided by the actuator 605 may be transmitted to the trailing arms 602, 603 (and the wheels 2c, 2d) via the shafts 630c, 630d, and 630e.

Furthermore, to enable independent motion of the wheels 2c, 2d, the suspension system 600 may also include a gear 620 (e.g., a differential with a fixed cage) between the shafts 630c and 630e (i.e., within the path of the actuator 605). In this manner, when the vehicle 1 is leaning into a curve (e.g., leaning to the right), the gear 620 may allow the trailing arm 602 to move up and the trailing arm 603 to move down. As above, without such a gear, the change caused by the rotation (i.e., during the leaning event) would generate undesirable relative rotation in the actuator 605, which would impede the vehicle's leaning. In various embodiments, for example, the gear 620 has a ratio of about −1, meaning that the gear 620 may invert the input rotation. In this manner, if the trailing arm 602 moves up, the trailing arm 603 may move down by the same amount. In other words, the gear 620 ensures that the actuator 605 does not experience any relative rotation to impact the leaning of the vehicle 1.

Such an embodiment may be utilized, for example, by a leaning vehicle 1 that uses another device (i.e., besides the actuator 605), such as, for example, a steering wheel angle, to generate the lean of the vehicle 1. Such vehicles may, for example, use counter steer to generate the lean of the vehicle 1. In other words, to angle the vehicle 1 to the left, the vehicle 1 is steered to the right, thereby causing centrifugal forces which will bank the vehicle 1 to the left. Thus, in such embodiments, the actuator 605 would be used infrequently, and only in designated situations, such as, for example, while parking on an angled slope and/or after an emergency braking event while driving around a curve. In such situations, the vehicle 1 may be positioned at an unwanted angle (i.e., experience a lean), but not have sufficient speed to adjust the lean by counter steer.

As illustrated in FIG. 13, in various additional embodiments, for a vehicle 1 having an alternative powertrain layout, the actuator 705 may be connected to the trailing arms 702, 703 via a differential 720 acting between the trailing arms 702, 703. In such embodiments, the powertrain assembly may include first and second axles 722, 723 and a powertrain differential 726 acting between the axles 722, 723. The axles 722, 723 are respectively connected to drive belts 724, 725 (which are in turn connected to respective wheels 2c, 2d of the vehicle 1), and the powertrain differential 726 (which is connected to an engine/transmission 750 of the vehicle 1 via a prop shaft 721) drives the axles 722, 723 to drive the wheels 2c, 2d. As shown in FIG. 13, a link 730 connects the trailing arm 703 to the trailing arm 702 via the differential 720. Thus, when the suspension system 700 is in use, the rotational forces (i.e., counteracting torque) provided by the actuator 705 (which is also connected to the differential 720 at the trailing arm 702) may be transmitted to the trailing arms 702, 703 (and the wheels 2c, 2d) via the differential gear 720 and the link 730. As above, the differential 720 may also enable independent motion of the wheels 2c, 2d. Thus, when the vehicle 1 is leaning into a curve (e.g., leaning to the right), the gear 720 may allow the trailing arm 702 to move up, while the trailing arm 703 moves down. In other words, as above, the gear 720 may have a ratio of about −1, thereby inverting the input rotation. In this manner, if the trailing arm 702 moves up, the trailing arm 703 may move down by the same amount.

As above, those of ordinary skill in the art would understand that the suspension systems 300, 400, 500, 600, 700 of FIGS. 8-13 are exemplary only, and that the balancer systems and rotary actuator assemblies portrayed in FIGS. 8-13 may have various alternative configurations, components, arrangements of components, and/or interface locations with the trailing arms to which they connect to provide both spring/damping and leaning functions, without departing from the scope of the present disclosure and claims. Those of ordinary skill in the art would understand, for example, that the longitudinal length d between the balancer interface (e.g., where the connecting rods interface with the trailing arms) and the wheel hub may vary for each type of suspension system and may be chosen based upon a particular suspension application and the available package space within the vehicle. In the same manner, the various interface locations of the suspension systems' other components (e.g., drive shafts, rotary actuator axles, etc.) with the trailing arms may vary and may be also chosen based upon a particular application.

Those of ordinary skill in the art would further understand that the various powertrain assembly layouts portrayed in the embodiments of FIGS. 8-13 are also exemplary, and that the teachings of the present disclosure may be applied to any type and/or configuration of powertrain for a motor vehicle.

An exemplary method for stabilizing a tiltable, multitrack vehicle in accordance with an exemplary embodiment of the present disclosure is set forth in the following description with reference to the vehicle 1 of the embodiment of FIGS. 1-3. To stabilize the vehicle 1 during a roll motion of the vehicle 1, a first load may be distributed via a first mechanism positioned within a rear suspension of the vehicle 1. To stabilize the vehicle 1, for example, the first load may be distributed to influence a leaning angle of the vehicle 1. In accordance with various exemplary embodiments, distributing the first load may comprise distributing the first load via either a balancer system or a rotary device positioned within the rear suspension of the vehicle 1.

As described above, for example, as the vehicle 1 goes around a bend, the vehicle 1 may tilt into the bend such that wheels 2c, 2d and the body 5 of the vehicle 1 lean into the bend. In various embodiments, to stabilize the vehicle 1 (e.g., preventing overturning of the vehicle 1), a balancer system 104, 204 (see FIGS. 6 and 7) positioned within the rear suspension may act to counteract the torque created by the lean of the vehicle 1. And, in various additional embodiments, to stabilize the vehicle 1, a rotary actuator 305, 405, 505, 605, 705 (see FIGS. 8-13) positioned within the rear suspension may act to counteract the torque created by the lean of the vehicle 1. In this manner, in accordance with various embodiments, distributing the first load may influence a leaning angle of the vehicle 1.

To stabilize the vehicle during a jounce/rebound motion of the vehicle 1, a second load may be distributed via a second mechanism positioned within the rear suspension of the vehicle 1, wherein the second mechanism provides a different load path than the first mechanism. To stabilize the vehicle 1, for example, the second load may be distributed to suppress a resonant vertical motion of the vehicle 1. In accordance with various exemplary embodiments, distributing the second load may comprise distributing the second load via either a balancer system or a rotary device positioned within the rear suspension of the vehicle 1. In this manner, separate load paths are provided for each function (i.e., leaning and spring/damping) via the different mechanisms.

As also described above, for example, as the vehicle 1 goes over a bump in the road, a vibrational motion may develop between the body 5 of the vehicle 1 and the wheels 2c, 2d of the vehicle 1. In various embodiments, to stabilize the vehicle 1 (e.g., preventing a resonant up and down motion of the vehicle 1), a rotary spring/damper element 112, 212 (see FIGS. 6 and 7) positioned within the rear suspension may act to dampen out the vibrational motion created by the uneven road conditions. And, in various additional embodiments, to stabilize the vehicle 1, balancer systems 304, 404, 504, 604, 704 having vertical spring/damper elements 312c, 312d; 412c, 412d; 512c, 512d; 612c, 612d; 712c, 712d (see FIGS. 8-13) positioned within the rear suspension may act to dampen out the vibrational motion created by the uneven road conditions. In this manner, in accordance with various embodiments, distributing the second load may suppress a resonant vertical (i.e., up and down) motion of the vehicle 1.

Thus, in various embodiments, as illustrated in FIGS. 6 and 7, the first load may be distributed via the balancer system to influence the leaning angle of the vehicle 1, and the second load may be distributed via the rotary device (e.g., a rotary spring/damper element) to suppress the resonant vertical motion of the vehicle 1. While in various additional embodiments, as illustrated in FIGS. 8-13, the first load may be distributed via the rotary device (e.g., a rotary actuator) to influence the leaning angle of the vehicle 1, and the second load may be distributed via the balancer system to suppress the resonant vertical motion of the vehicle 1.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to automotive vehicles, and rear suspensions, those of ordinary skill in the art would understand that the present teachings as disclosed would work equally well for any type of vehicle having wheels connected to the vehicle via any type of suspension system.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an actuator" includes two or more different actuators. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A suspension system for a laterally tiltable, multitrack vehicle, comprising:
    a balancer system extending transversely between and connected to each of first and second trailing arms; and
    a rotary device acting between and connected to each of the first and second trailing arms at a different location than the balancer system,
    wherein one of the balancer system and the rotary device is configured to provide a torque to influence a leaning angle of the vehicle and a first load path linking the first and second trailing arms for the torque, and the other of the balancer system and the rotary device is configured to provide a second load path linking the first and second trailing arms, which is completely separate and distinct from the first load path, for suspension and road loads and to suppress resonant vertical motion of the vehicle caused by the suspension and road loads.

2. The suspension system of claim 1, wherein the first and second trailing arms are parallel to one another.

3. The suspension system of claim 1, wherein, when the suspension system is in use, the first and second trailing arms are each configured to extend between a rear wheel of the vehicle and a frame rail of the vehicle.

4. The suspension system of claim 1, wherein, when the suspension system is in use, the first and second trailing arms are configured to connect to respective first and second drive shafts of the vehicle.

5. The suspension system of claim 1, further including a gear positioned within a path of the rotary device.

6. The suspension system of claim 5, wherein the gear is a differential with a ratio of about −1.

7. The suspension system of claim 1, wherein the balancer system is configured to provide the torque and the rotary device is configured to suppress the resonant vertical motion.

8. The suspension system of claim 7, wherein the balancer system comprises a balancer control arm extending in a transverse direction between and connected to each of the first and second trailing arms, a hinged control arm connected to the balancer control arm, and an actuator attached to the hinged control arm.

9. The suspension system of claim 7, wherein the rotary device comprises a rotary spring/damper element.

10. The suspension system of claim 9, wherein the rotary spring/damper element comprises a liquid based hydraulic mechanism extending transversely between the first and second trailing arms.

11. The suspension system of claim 1, wherein the balancer system is configured to suppress the resonant vertical motion and the rotary device is configured to provide the torque.

12. The suspension system of claim 11, wherein the balancer system comprises two vertical spring/damper elements connected to opposite ends of a balancer control arm.

13. The suspension system of claim 12, wherein the vertical spring/damper elements each include a shock absorber and a coil spring.

14. The suspension system of claim 11, wherein the rotary device comprises a rotary actuator.

15. The suspension system of claim 14, wherein the rotary actuator is axle mounted.

16. The suspension system of claim 14, wherein the rotary actuator is body mounted.

17. A rear suspension system for a laterally tiltable, multitrack vehicle, comprising:
    first and second trailing arms, each of the first and second trailing arms extending between a rear wheel of the vehicle and a frame rail of the vehicle;
    a balancer system extending transversely between and connected to each of the first and second trailing arms, the balancer system being configured to create a torque to influence a leaning angle of a body of the vehicle and to provide a first load path for the torque; and
    a rotary spring/damper element acting between and connected to each of the first and second trailing arms at a different location than the balancer system, the rotary spring/damper element being configured to provide a second load path, which is completely separate and distinct from the first load path, for suspension and road loads and to suppress a resonant vertical motion of the body of the vehicle caused by the suspension and road loads.

18. The suspension system of claim 17, wherein the balancer system comprises a balancer control arm extending in a transverse direction between and connected to each of the first and second trailing arms, a hinged control arm connected to the balancer control arm, and an actuator attached to the hinged control arm.

19. The suspension system of claim 17, wherein the rotary spring/damper element comprises a liquid based hydraulic mechanism extending transversely between the first and second trailing arms.

20. The suspension system of claim 19, wherein the liquid based hydraulic mechanism comprises a vane, dashpot, and/or magneto rheological damping element.

21. A rear suspension system for a laterally tiltable, multitrack vehicle, comprising:
    first and second trailing arms, each of the first and second trailing arms extending between a rear wheel of the vehicle and a frame rail of the vehicle;
    a balancer system extending transversely between and connected to each of the first and second trailing arms, the balancer system being configured to provide a first load path for suspension and road loads and to suppress a resonant vertical motion of a body of the vehicle caused by the suspension and road loads; and
    a rotary actuator acting between and connected to each of the first and second trailing arms at a different location than the balancer system, the rotary actuator being configured to create a torque to influence a leaning angle of the body of the vehicle and to provide a second load path, which is completely separate and distinct from the first load path, for the torque.

22. The suspension system of claim 21, wherein the balancer system comprises two vertical spring/damper elements connected to opposite ends of a balancer control arm.

23. A method of stabilizing a tiltable, multitrack vehicle comprising a first rear wheel mounted to a first rear trailing arm and a second rear wheel mounted to a second rear trailing arm, the method comprising:

distributing a first load, during a roll motion of the vehicle, via a first mechanism positioned within a rear suspension of the vehicle to influence a leaning angle of the vehicle; and distributing a second load, during a jounce/rebound motion of the vehicle, via a second mechanism positioned within the rear suspension of the vehicle to suppress a resonant vertical motion of the vehicle, wherein the second mechanism is connected to each of the first rear trailing arm and the second rear trailing arm at a different location than the first mechanism such that the second mechanism provides a completely separate and distinct load path, which links the rear trailing arms, from the first mechanism.

24. The method of claim 23, wherein the distributing of the first load comprises distributing the first load via either a balancer system or a rotary device.

25. The method of claim 23, wherein the distributing of the second load comprises distributing the second load via either a balancer system or a rotary device.

* * * * *